United States Patent
Erdl et al.

(10) Patent No.: US 11,208,035 B2
(45) Date of Patent: Dec. 28, 2021

(54) LIGHTING APPARATUS FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE); Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 16/427,804

(22) Filed: May 31, 2019

(65) Prior Publication Data

US 2019/0283666 A1    Sep. 19, 2019

Related U.S. Application Data (63) Continuation of application No. PCT/EP2018/054132, filed on Feb. 20, 2018.

(30) Foreign Application Priority Data

Mar. 9, 2017 (DE) .................... 10 2017 203 889.6

(51) Int. Cl.
*B60Q 1/50* (2006.01)
*F21S 41/24* (2018.01)
(Continued)

(52) U.S. Cl.
CPC ................ *B60Q 1/50* (2013.01); *B60K 35/00* (2013.01); *B60Q 1/14* (2013.01); *B60Q 1/34* (2013.01);
(Continued)

(58) Field of Classification Search
CPC .. F21S 43/33; F21S 43/13; F21S 43/16; F21S 43/37; F21S 43/251; F21S 43/26; F21S 41/24; F21S 41/16; F21S 41/37
See application file for complete search history.

(56) References Cited

U.S. PATENT DOCUMENTS

| | | | |
|---|---|---|---|
| 6,152,588 A | 11/2000 | Scifres | |
| 10,239,441 B2 | 3/2019 | Erdl et al. | |

(Continued)

FOREIGN PATENT DOCUMENTS

| | | |
|---|---|---|
| CN | 105717652 A | 6/2016 |
| DE | 698 05 626 T2 | 9/2002 |

(Continued)

OTHER PUBLICATIONS

International Search Report (PCT/ISA/210) issued in PCT Application No. PCT/EP2018/054132 dated Jun. 18, 2018 with English translation (five pages).

(Continued)

*Primary Examiner* — Anabel Ton
(74) *Attorney, Agent, or Firm* — Crowell & Moring LLP (57) ABSTRACT

A lighting apparatus for a motor vehicle has a lighting module. The lighting module includes a laser light source for generating laser light. The laser light source has one or more laser diodes. The lighting module also includes an optical device on which the laser light is incident and which is designed to generate a defined symbol in the surroundings of the motor vehicle. The optical apparatus includes one or more holographically optical elements which are substantially non-absorbent to the laser light and which are designed to produce an interference of the laser light by phase modulation thereof in order to generate the defined symbol.

10 Claims, 4 Drawing Sheets

(51) Int. Cl.
| | |
|---|---|
| *F21S 43/33* | (2018.01) |
| *F21S 41/16* | (2018.01) |
| *F21S 41/37* | (2018.01) |
| *F21S 43/251* | (2018.01) |
| *B60K 35/00* | (2006.01) |
| *B60Q 1/14* | (2006.01) |
| *B60Q 1/34* | (2006.01) |
| *B60Q 1/44* | (2006.01) |
| *G02B 5/32* | (2006.01) |
| *F21S 43/20* | (2018.01) |
| *F21S 43/31* | (2018.01) |
| *F21S 43/13* | (2018.01) |
| *F21Y 115/30* | (2016.01) |
| *F21Y 113/13* | (2016.01) |
| *G03H 1/22* | (2006.01) |
| *F21S 43/235* | (2018.01) |

(52) U.S. Cl.
CPC ............... *B60Q 1/44* (2013.01); *F21S 41/16* (2018.01); *F21S 41/24* (2018.01); *F21S 41/37* (2018.01); *F21S 43/13* (2018.01); *F21S 43/251* (2018.01); *F21S 43/26* (2018.01); *F21S 43/31* (2018.01); *F21S 43/33* (2018.01); *G02B 5/32* (2013.01); *B60K 2370/29* (2019.05); *B60K 2370/333* (2019.05); *B60K 2370/334* (2019.05); *B60K 2370/52* (2019.05); *B60K 2370/797* (2019.05); *B60Q 2400/20* (2013.01); *B60Q 2400/50* (2013.01); *F21S 43/235* (2018.01); *F21Y 2113/13* (2016.08); *F21Y 2115/30* (2016.08); *G03H 1/2202* (2013.01)

(56) References Cited

U.S. PATENT DOCUMENTS

| | | | |
|---|---|---|---|
| 2005/0117364 | A1 | 6/2005 | Rennick et al. |
| 2008/0198372 | A1 | 8/2008 | Pan |
| 2013/0208273 | A1 | 8/2013 | Dominguez-Caballero et al. |
| 2015/0009695 | A1 | 1/2015 | Christmas et al. |
| 2015/0323143 | A1 | 11/2015 | Raring et al. |
| 2015/0375672 | A1 | 12/2015 | Takahashi |
| 2017/0030544 | A1 | 2/2017 | Tsuda et al. |
| 2017/0038582 | A1 | 2/2017 | Chau et al. |
| 2017/0106793 | A1 | 4/2017 | Kumar et al. |
| 2017/0276313 | A1 | 9/2017 | Giepen et al. |
| 2017/0334341 | A1 | 11/2017 | Kurashige et al. |
| 2017/0361762 | A1 | 12/2017 | Wunsche, III et al. |
| 2018/0188532 | A1 | 7/2018 | Christmas et al. |
| 2019/0024862 | A1 | 1/2019 | Kurashige et al. |
| 2019/0100198 | A1 | 4/2019 | Hakki et al. |
| 2019/0285239 | A1* | 9/2019 | Erdl .................... F21S 41/16 |
| 2019/0389373 | A1* | 12/2019 | Erdl .................... B60Q 1/0035 |

FOREIGN PATENT DOCUMENTS

| | | |
|---|---|---|
| DE | 10 2006 050 546 A1 | 4/2008 |
| DE | 10 2006 050 547 A1 | 4/2008 |
| DE | 10 2006 050 548 A1 | 4/2008 |
| DE | 10 2011 119 923 A1 | 5/2013 |
| DE | 10 2012 205 435 A1 | 10/2013 |
| DE | 10 2013 221 067 A1 | 5/2015 |
| DE | 10 2014 214 930 A1 | 2/2016 |
| DE | 10 2014 223 933 A1 | 5/2016 |
| DE | 10 2014 117 837 A1 | 6/2016 |
| DE | 10 2015 003 527 A1 | 9/2016 |
| EP | 1 916 153 A2 | 4/2008 |
| EP | 3 069 933 A2 | 9/2016 |
| FR | 2 995 269 A1 | 3/2014 |
| JP | 2015-132707 A | 7/2015 |
| JP | 2015-164828 A | 9/2015 |
| KR | 10-2015-0134979 A | 12/2015 |
| WO | WO 2015/199307 A1 | 12/2015 |
| WO | WO 2016/072483 A1 | 5/2016 |
| WO | WO 2016/072484 A1 | 5/2016 |
| WO | WO 2016/072505 A1 | 5/2016 |
| WO | WO 2016/087642 A1 | 6/2016 |
| WO | WO 2016/088510 A1 | 6/2016 |
| WO | WO 2016/091795 A1 | 6/2016 |

OTHER PUBLICATIONS

German-language Written Opinion (PCT/ISA/237) issued in PCT Application No. PCT/EP2018/054132 dated Jun. 18, 2018 (six pages).

German-language Search Report issued in counterpart German Application No. 10 2017 203 889.6 dated Jan. 16, 2018 with partial English translation (13 pages).

International Search Report (PCT/ISA/210) issued in PCT Application No. PCT/EP2018/054131 dated Jun. 8, 2018 with English translation (seven pages).

German-language Written Opinion (PCT/ISA/237) issued in PCT Application No. PCT/EP2018/054131 dated Jun. 8, 2018 (six pages).

German-language Search Report issued in German Application No. 10 2017 203 891.8 dated Nov. 7, 2017 with partial English translation (11 pages).

Chinese-language Office Action issued in Chinese Application No. 201880004986.6 dated Nov. 13, 2020 with English translation (13 pages).

Chinese-language Office Action issued in Chinese Application No. 201880005043.5 dated Jun. 25, 2021 with English translation (14 pages).

German-language Office Action issued in European Application No. 18 708 072.6 dated Mar. 12, 2021 (six (6) pages).

\* cited by examiner

LIGHTING APPARATUS FOR A MOTOR VEHICLE

CROSS REFERENCE TO RELATED APPLICATIONS

This application is a continuation of PCT International Application No. PCT/EP2018/054132, filed Feb. 20, 2018, which claims priority under 35 U.S.C. § 119 from German Patent Application No. 10 2017 203 889.6, filed Mar. 9, 2017, the entire disclosures of which are herein expressly incorporated by reference.

This application contains subject matter related to U.S. application Ser. No. 16/428,120, entitled "Lighting Apparatus for a Motor Vehicle" filed on even date herewith.

BACKGROUND AND SUMMARY OF THE INVENTION

The invention relates to a lighting apparatus for a motor vehicle and also to a corresponding motor vehicle.

Approaches according to which symbols are projected onto the ground in the area surrounding a motor vehicle by means of a light module are known from the prior art. The problem with said approaches is that the range of light modules of said kind is limited and therefore the symbols which are generated using the said light modules can be used only to a limited extent for driver assistance and/or for communication with other road users (for example as warning signals).

The object of the invention is therefore to provide a lighting apparatus for a motor vehicle comprising a light module with which a readily perceivable simple arrangement can be generated at a relatively large distance from the motor vehicle.

The lighting apparatus according to the invention is intended for a motor vehicle, in particular a passenger car and possibly also a truck. The lighting apparatus comprises a light module which will be described in more detail below. The lighting apparatus may possibly also have a plurality of light modules of this kind. The light module contains a laser light source for generating laser light, wherein the laser light source comprises one or more laser diodes. In this case, the power of the respective laser diodes is between 200 mW and 300 mW, but may possibly also be higher and be up to 3 to 4 watts. The laser light source preferably produces one or more collimated beams of laser light.

If, in the text which follows and in particular in the patent claims, interactions between the lighting apparatus and the motor vehicle are described, this is always intended to be understood to mean that the interaction occurs when the lighting apparatus is arranged or installed in the motor vehicle. The components of the lighting apparatus which are in corresponding interaction with the motor vehicle or components of the motor vehicle are therefore configured in such a way that the interaction is caused when the lighting apparatus is arranged or installed in the motor vehicle.

The light module of the lighting apparatus according to the invention contains an optical device on which the laser light which is generated by the laser light source is incident and which is configured in such a way that it generates a predefined symbol arrangement in the area surrounding the motor vehicle, preferably on the ground, when the lighting apparatus in the motor vehicle is in operation. The optical device comprises one or more holographic optical elements which are substantially non-absorbent to the laser light and which are designed to cause interference of the laser light by means of phase modulation thereof in order to generate the predefined symbol arrangement. In this case, the term "non-absorbent" is intended to be understood in such a way that the laser light has an intensity of 95% or more and in particular of 99% or more and particularly preferably of 100% after passing the holographic optical element or elements in comparison to the intensity before passing the holographic optical element or elements. Depending on the embodiment, the holographic elements can respectively be reflective or transmissive elements.

The above term "the symbol arrangement" is intended to be understood in such a way that it comprises one or more symbols which can be perceived by a human. In particular, the symbols can be perceived by the driver and/or an occupant of the motor vehicle or else also road users in the area surrounding the motor vehicle. In a preferred variant, the symbol arrangement comprises one or more arrows and/or one or more lines. Depending on the refinement, the symbol arrangement can comprise one or more white and/or one or more colored symbols.

The above term "the area surrounding the motor vehicle" is intended to be understood in a broad sense and can correspond, in particular, to the range of a high beam or low beam of the headlamp of the motor vehicle. As described further below, the light module can also be installed in a headlamp of the motor vehicle. If, in this case, the symbol arrangement is superimposed with the headlamp light of the motor vehicle, it is so bright that it is still visible even in the headlamp light.

The invention is distinguished in that phase-modulated holographic optical elements are used in a lighting apparatus for a motor vehicle for the first time. Holographic optical elements of this kind are known per se and are distinguished in that the structures for deflecting the light are in the region of the wavelength of said light, so that diffraction effects occur. According to the invention, this ensures that the laser light is coherent when passing the holographic optical elements, so that the light can interfere.

The lighting apparatus according to the invention has the advantage that a desired symbol arrangement can be generated in the area surrounding the motor vehicle in a simple manner owing to the use of phase-modulated holographic optical elements. A sufficient degree of brightness of the symbol arrangement is also ensured by the holographic optical elements being substantially non-absorbent to the laser light.

In a preferred variant of the lighting apparatus according to the invention, the holographic optical element or elements comprise one or more diffractive optical elements which are known per se.

In a further refinement, the total surface area of the holographic optical element or elements in plan view is between 25 mm$^2$ and 500 mm$^2$, in particular between 25 mm$^2$ and 250 mm$^2$. Owing to the use of holographic optical elements of this kind, the laser light is distributed over a surface region, as a result of which a sufficient degree of eye safety is ensured.

In a further preferred embodiment, the light module is configured in such a way that the laser light of the laser light source is directed to the optical device with the interposition of one or more optical fibers, as a result of which flexible installation of the light module in the lighting apparatus is rendered possible. Nonetheless, it is also possible for the laser light to be directed to the optical device without the interposition of optical fibers of this kind.

In a further particularly preferred embodiment, the lighting apparatus comprises, in addition to the light module, a light device in order to generate a predefined light distribution in addition to the symbol arrangement. In other words, the symbol arrangement is generated at the same time as the predefined light distribution is produced. In this case, the lighting apparatus is preferably a headlamp or comprises a headlamp, wherein, in this case, the light device is designed to generate low beam and/or high beam distribution as predefined light distribution. Nonetheless, it is also possible for the lighting apparatus to comprise a vehicle signaling lamp, such as a rear light and/or a brake light for example. In this case, the light device is designed to generate a light signal as predefined light distribution.

In a preferred variant of the above embodiments which comprise a light device in addition to the light module, when the light device is switched on and the light module is switched on, the predefined symbol arrangement is superimposed with the predefined light distribution. Therefore, the symbol arrangement is configured in such a way that it is visible in spite of the additional light distribution and can be distinguished from said additional light distribution. If the lighting apparatus is a headlamp which emits white headlamp light, the symbol arrangement preferably also has a white color. If, however, the lighting apparatus emits monochromatic light, the color of the symbol arrangement preferably also corresponds to the color of this light. Statutory provisions are taken into account in this way.

In a further variant, the lighting apparatus according to the invention is configured in such a way that the light module can be switched on only when the light device is switched on, it being possible for this to be achieved using a suitable control device. Appropriate statutory provisions are taken into account with this variant too.

In a particularly preferred embodiment of the lighting apparatus according to the invention which constitutes, in particular, a headlamp, the laser light source is an RGB laser light source which comprises a number of (that is to say one or more) red laser diodes, a number of (that is to say one or more) green laser diodes and a number of (that is to say one or more) blue laser diodes as laser diodes. The wavelengths which are usually employed in RGB light systems are used as wavelengths for the light of the individual laser diodes. The red laser light preferably has a wavelength of between 610 nm and 760 nm, the green light preferably has a wavelength of between 500 nm and 750 nm, and the blue laser light preferably has a wavelength of between 450 nm and 500 nm.

In the above lighting apparatus with an RGB laser light source, a first holographic optical structure on which (preferably only) the red laser light of the number of red laser diodes is incident is associated with the number of red laser diodes, whereas a second holographic optical structure on which (preferably only) the green laser light of the number of green laser diodes is incident is associated with the number of green laser diodes. Furthermore, a third holographic optical structure on which (preferably only) the blue laser light of the diodes is incident is associated with the number of blue laser diodes. In this case, the first, second and third holographic optical structures are constituent parts of the holographic optical element or elements. In this embodiment, the light module is configured in such a way that the red, green and blue laser light is superimposed after passing the first, second and third holographic optical structures and as a result the symbol arrangement is generated in white light.

In a further variant of the lighting apparatus according to the invention, the optical device comprises, in addition to the holographic optical element or elements, one or more further optical elements which follow the holographic optical element or elements, in particular one or more lenses and/or mirrors, in the beam path of the laser light.

If the embodiment just described is combined with the above variants comprising an RGB laser light source, the further optical element or elements preferably comprise a first mirror, a second and a third mirror. Only a first laser light selected from the red, green and blue laser light is incident on the first mirror when the light module is switched on, wherein the first mirror reflects the first laser light. Only the first laser light, which is reflected at the first mirror, and a second laser light selected from the red, green and blue laser light are incident on the second mirror when the light module is switched on, wherein the second laser light differs from the first laser light (that is to say has a different color) and wherein the second mirror reflects the second laser light and transmits the first laser light. Only the first laser light, which is transmitted at the second mirror, the second laser light, which is reflected at the second mirror, and a third laser light selected from the red, green and blue laser light are incident on the third mirror when the light module is switched on, wherein the third laser light differs from the first and second laser light (that is to say has a different color) and wherein the third mirror reflects the third laser light and transmits the first and second laser light, wherein the first, second and third mirrors are arranged in relation to one another in such a way that the laser light which is reflected at these mirrors is superimposed and as a result the symbol arrangement is generated in white light.

In a further variant, the lighting apparatus comprises an actuator system with which the light module can be moved relative to the rest of the lighting apparatus. In this way, movement of the generated symbol arrangement can be achieved and accordingly the ability to perceive said symbol arrangement can be improved.

In a further preferred embodiment, the lighting apparatus according to the invention comprises a control device which is designed to receive sensor signals from a surrounding area sensor system of the motor vehicle and to control the processes of switching on and switching off the light module depending on the sensor signals of the surrounding area sensor system. The surrounding area sensor system may be, for example, a camera-based sensor system or else possibly a radar and/or lidar sensor system or a combination of different sensor systems.

In a preferred variant of the embodiment just described, the control device is configured in such a way that the light module is switched on when one or more objects, preferably one or more objects at a minimum distance from the motor vehicle, are detected by the surrounding area sensor system. The lighting apparatus can be used, in particular, in combination with a driver assistance system of the motor vehicle. In this case, the symbol arrangement can display, for example by means of lines in front of the vehicle, the width of the roadway. Similarly, a collision warning which warns the occupants of the motor vehicle and/or other road users when a distance from the other road users is undershot, can be displayed by means of the symbol arrangement.

In addition to the above-described lighting apparatus, the invention relates to a motor vehicle which comprises one or more of said lighting apparatuses. Depending on the refinement, said motor vehicle may be a manually controlled motor vehicle, but may also be a self-driving motor vehicle. In the case of a self-driving motor vehicle, the symbol arrangement serves primarily to inform or warn other road users in the area of the self-driving motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

One embodiment of the invention will be described below using a lighting apparatus in the form of a front headlamp of a motor vehicle. The front headlamp contains, in a manner which is known per se, a light device with which the low beam and the high beam are generated, wherein said light device is not shown in the figures. In addition to this light device, a light module is installed in the headlamp, which light module can generate a specific symbol arrangement on the road in front of the motor vehicle in parallel to the low beam or high beam.

Figure 1:
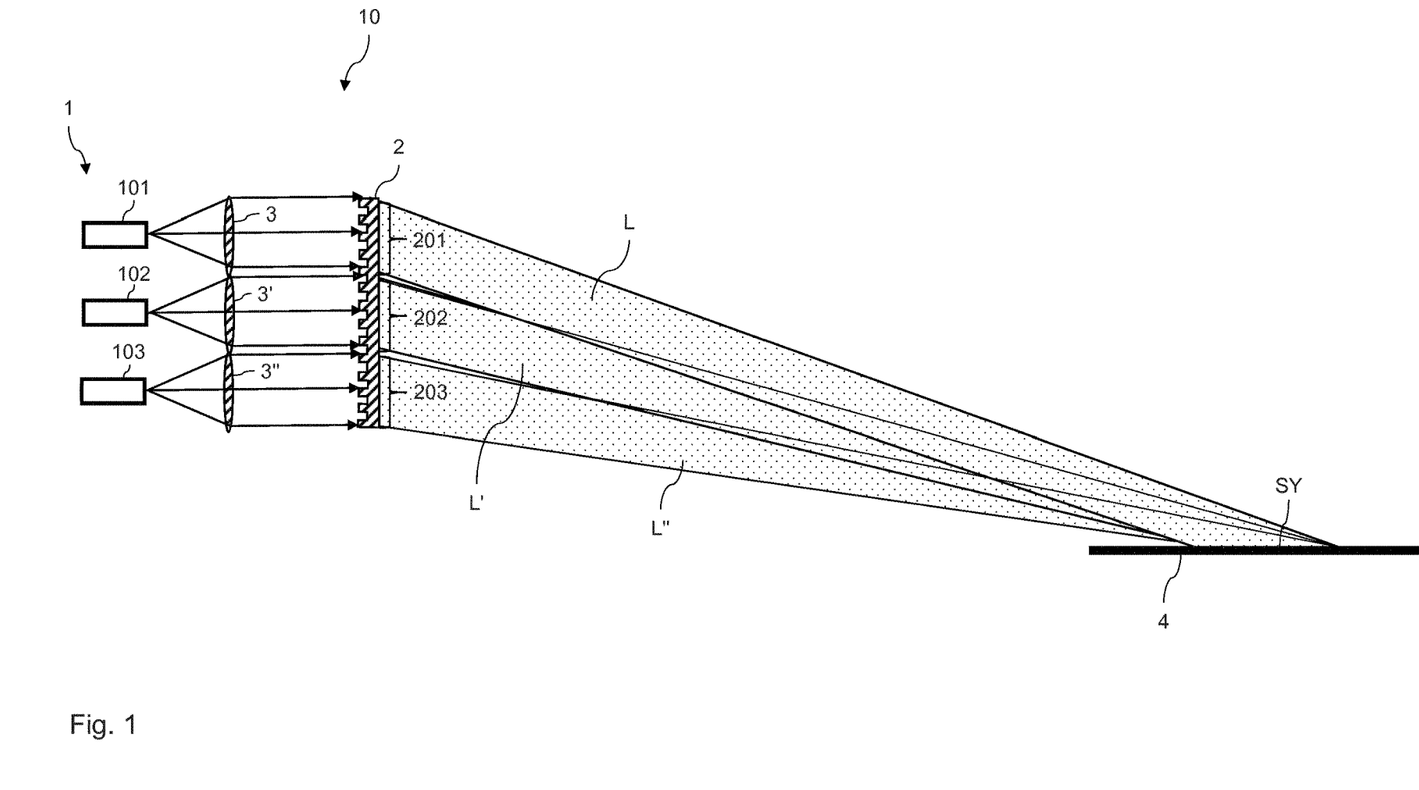
FIG. 1 is a schematic illustration which shows a first embodiment of a light module in a lighting apparatus according to the invention.

FIG. 1 shows a first embodiment of a light module of this kind. The light module is denoted by reference symbol 10 overall and, in the embodiment described here, comprises a laser light source 1 with three laser diodes 101, 102 and 103 and also three collimator lenses 3, 3', 3". The laser diode 101 is a red laser diode, the laser diode 102 is a green laser diode, and the laser diode 103 is a blue laser diode. The light of the respective laser diodes is indicated by arrows which start from said diodes. The laser light of the individual diode is initially collimated by the collimator lenses 3, 3' and 3". In this case, the collimator lens 3 collimates the red laser light of the laser diode 101, the collimator lens 3' collimates the green laser light of the laser diode 102, and the collimator lens 3" collimates the blue laser light of the laser diode 103. The collimated laser light beams are then incident on the merely schematically indicated transmissive holographic optical element 2. Owing to the structuring on the left-hand side of the element, phase modulation and interference of the incident laser beams is produced in the process.

In the embodiment described here, a single continuous holographic optical element 2 which has corresponding holographic optical structures 201, 202 and 203 for the different laser light beams is used. In this case, the red laser light beam is incident on the holographic optical structure 201, the green laser light beam is incident on the holographic optical structure 202, and the blue laser light beam is incident on the holographic optical structure 203.

In FIG. 1, the red laser light beam is denoted by reference symbol L after passing the structure 201, the green laser light beam is denoted by reference symbol L' after passing the structure 202, and the blue laser light beam is denoted by L" after passing the structure 203. In this case, the structures of the holographic optical element are configured in such a way that the individual light beams L, L' and L" produce the same symbol arrangement at the same point on the road 4, so that a superimposed symbol arrangement SY appears in white at this point. In this case, the brightness of the symbol arrangement is greater than the brightness of the low beam or high beam, so that the symbol arrangement is distinguished from the low beam and high beam and therefore is visible to the driver of the motor vehicle and, respectively, to other road users. In the embodiment of FIG. 1, the phase-modulated laser light which originates from the holographic optical element 2 is cast directly onto the road 4. However, if desired, yet further optical elements, such as one or more lenses for example, can also be provided in the beam path downstream of the holographic optical element.

Figure 2:
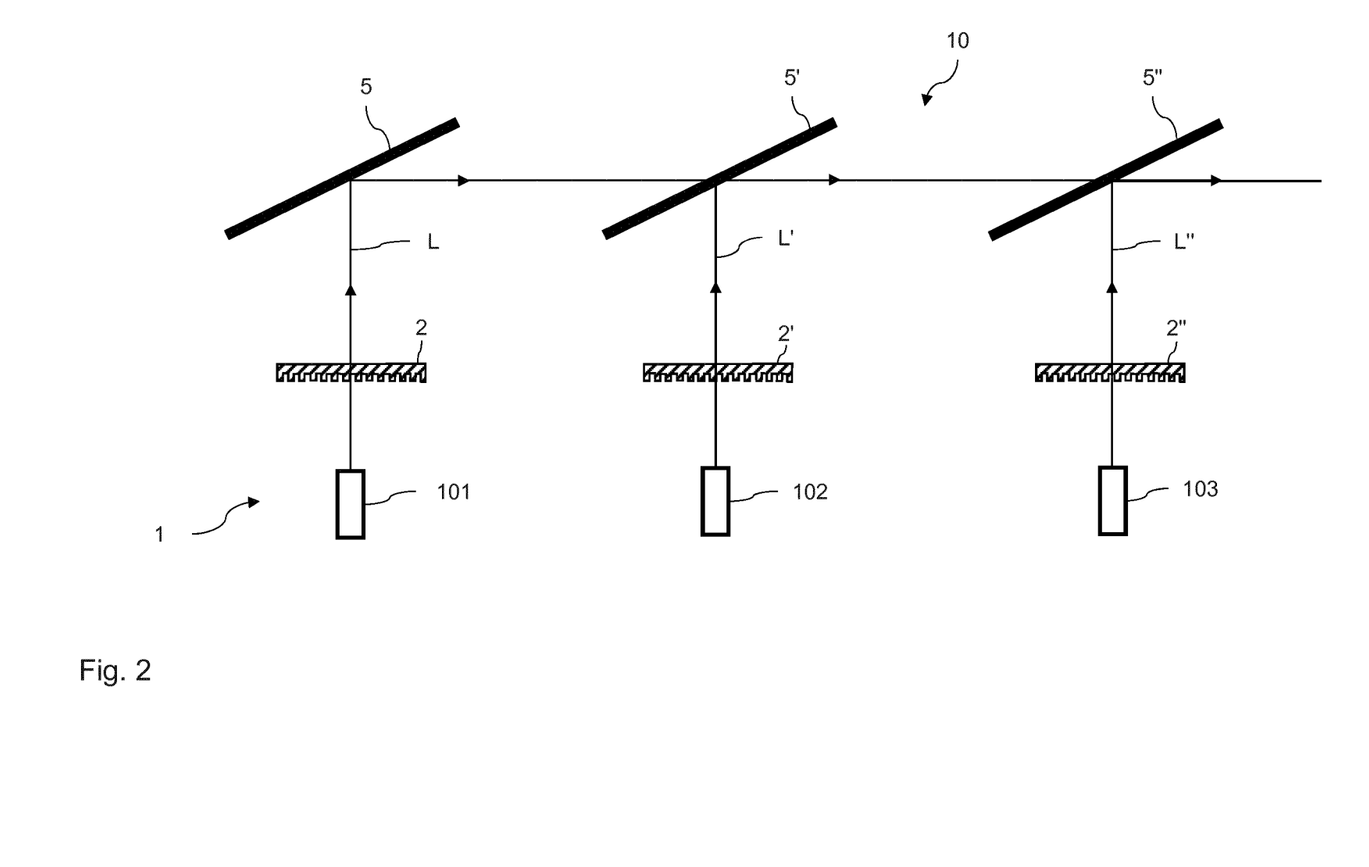
FIG. 2 is a schematic illustration which shows a second embodiment of a light module in a lighting apparatus according to the invention.

FIG. 2 shows a simplified illustration of a modification of the light module from FIG. 1. In FIG. 2, the collimator lenses 3, 3' and 3" are no longer shown and the light beams L, L' and L" of the individual laser diodes are merely schematically indicated by arrows. In the embodiment of FIG. 2, analogously to FIG. 1, a laser light source 1 is provided with a red laser diode 101, a green laser diode 102 and a blue laser diode 103. However, in contrast to FIG. 1, the light module now contains three separate holographic optical elements 2, 2' and 2". In this case, the red laser light of the laser diode 101 is incident on the holographic optical element 2, the green laser light of the laser diode 102 is incident on the holographic optical element 2', and the blue laser light of the laser diode 103 is incident on the holographic optical element 2". The holographic optical elements, analogously to the holographic optical structures 201 to 203 of FIG. 1, cause phase modulation of the laser light. However, the laser light is not cast directly onto the road after passing the individual holographic optical elements, but rather is deflected by means of three mirrors 5, 5' and 5".

In this case, the mirror 5 is reflective to the red laser light and possibly also to the light of other wavelengths. In contrast, the mirror 5' is a dichroic mirror which is reflective to the green laser light and transmissive to the light of other wavelengths. Furthermore, the mirror 5" is also a dichroic mirror which is reflective only to blue laser light and which transmits the light of other wavelengths. The mirrors 5, 5' and 5" are arranged parallel to one another and deflect the laser light of the individual laser diodes after passing the respective holographic optical elements. Owing to the above-described properties of the mirrors 5, 5' and 5", the red and, respectively, green laser light which is reflected at the mirrors 5 and, respectively, 5' reaches the mirror 5". There, said laser light is superimposed with the blue laser light which is reflected at the mirror 5". In this way, analogously to the embodiment of FIG. 1, the three laser light colors are superimposed, so that a white symbol arrangement SY which requires only ⅓ of the light exit area in comparison to the embodiment of FIG. 1 for the same light intensity is produced on the road 4.

Figure 3:
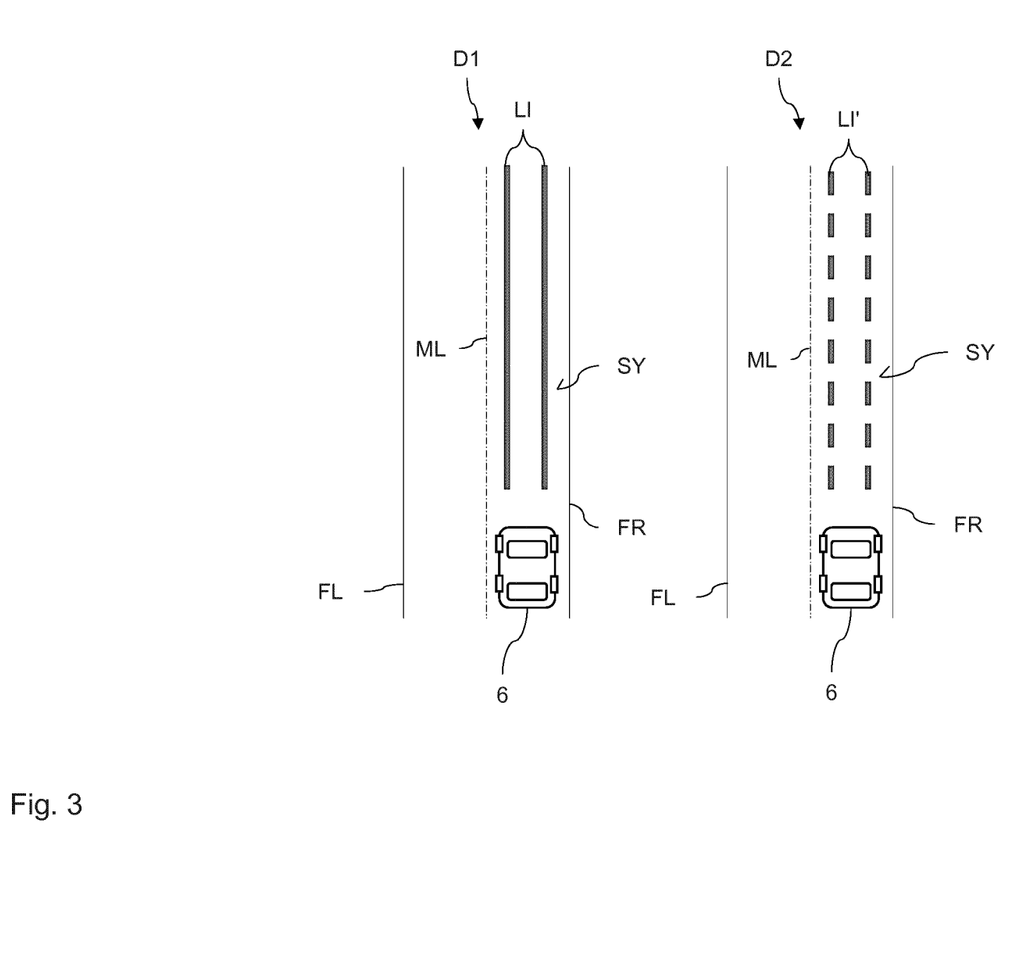
FIG. 3 and FIG. 4 show different plan views of motor vehicles comprising the lighting apparatus according to the invention, wherein the generation of different symbol arrangements is illustrated.
Figure 4:
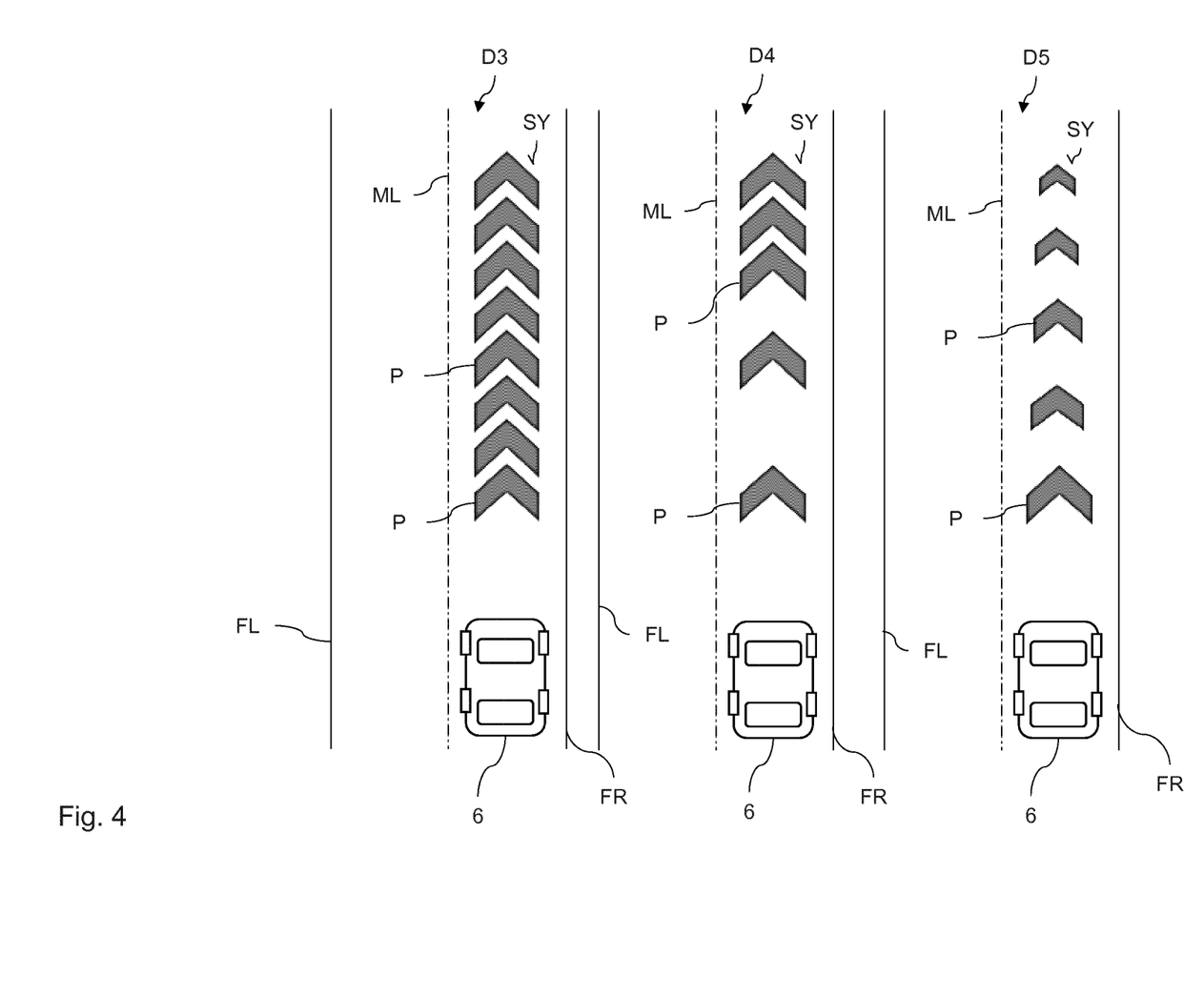

FIG. 3 and FIG. 4 illustrate, by way of example, what types of symbols can be generated by means of the lighting apparatus according to the invention. Both figures show different plan views D1 to D5 of a motor vehicle 6 which is traveling on a right-hand-side lane on a roadway. The direction of travel is the upward direction in FIG. 3 and FIG. 4. In the individual diagrams, the right-hand-side roadway edge is denoted by reference symbol FR, the left-hand-side roadway edge is denoted by reference symbol FL, and the central strip is denoted by reference symbol ML. In this case, the individual symbol arrangements generated are optionally generated by a light module according to the invention in the left-hand-side front headlamp and a light module according to the invention in the right-hand-side front headlamp of the motor vehicle 6.

According to the plan view D1, the symbol arrangement SY generated comprises two parallel solid lines LI which run in the longitudinal direction of the roadway. According to the plan view D2, the symbol arrangement SY comprises two parallel dashed lines LI' which once again run in the longitudinal direction of the roadway. Both symbol arrangements of the plan views D1 and D2 are preferably used in combination with a driver assistance system of the motor vehicle. In this case, the right-hand-side roadway edge FR and the central strip ML are identified by a corresponding surrounding area sensor system (such as a camera for example) and the illustrated lines indicate the longitudinal profile of the roadway.

In contrast to FIG. 3, the plan views D3 to D5 of FIG. 4 show scenarios in which a symbol arrangement in the form of arrows P is produced in each case, wherein only some of these arrows are provided with said reference symbol for reasons of clarity. The arrows point in the direction of travel of the motor vehicle 6. According to the plan view D3, arrows of the same size are generated at the same distance from one another here. In contrast to this, according to the plan view D4, arrows of the same size are produced at distances which sometimes differ. In the plan view D5, the arrows are at the same distance from one another but their size decreases as the distance from the motor vehicle 6 increases.

Generating a symbol arrangement based on arrows according to FIG. 4 can be combined, for example, with a collision warning system of the motor vehicle 6. In this case, the motor vehicle uses a surrounding area sensor system to detect the presence of objects, such as a pedestrian for example, in front of the motor vehicle, in response to which the arrow symbol arrangement is output. As a result, the pedestrian and, respectively, the driver of the motor vehicle are made aware of impending danger. The symbol arrangement of arrows just described can possibly also be used in a self-driving vehicle, wherein primarily other road users are warned by the symbol arrangement in this case.

The embodiments of the invention described above have a range of advantages. In particular, a predefined symbol arrangement can be generated in the area surrounding the motor vehicle by a motor vehicle lighting device in a simple manner by means of one or more non-absorbent holographic optical elements. In this case, the holographic optical elements cause phase modulation, without reducing the light amplitude by absorption, so that largely no light losses occur. In this case, sufficient brightness of the symbol arrangement is ensured by means of a laser light source, wherein eye safety is ensured at the same time owing to the use of flat holographic optical elements. In a preferred variant, the lighting apparatus according to the invention can be combined with a control device which receives the signals of a surrounding area sensor system. The processes of switching on and switching off the lighting device can then be controlled depending on the signals of the surrounding area sensor system. For example, information concerning narrowing of the roadway or imminent collisions can be provided by means of the symbol arrangement.

LIST OF REFERENCE SYMBOLS

1 Laser light source
101, 102, 103 Laser diodes
2, 2', 2" Holographic optical elements
201, 202, 203 Holographic optical structures
3, 3', 3" Collimator lenses
4 Road
5, 5', 5" Mirrors
6 Motor vehicle
L, L', L' Laser light beam
SY Symbol arrangement
D1, D2 . . . , D5 Plan view
FL, FR Roadway edges
ML Central strip
LI, LI' Lines
P Arrows The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting apparatus for a motor vehicle, comprising:
a light module, wherein the light module comprises:
a laser light source for generating laser light, wherein the laser light source comprises one or more laser diodes, and
an optical device on which the laser light is incident and which is configured such that the optical device generates a predefined symbol arrangement in an area surrounding the motor vehicle, wherein the optical apparatus comprises one or more holographic optical elements which are substantially non-absorbent to the laser light and which are configured to produce interference of the laser light by phase modulation thereof in order to generate the predefined symbol arrangement,
wherein a total surface area of the one or more holographic optical elements in plan view is between 25 mm$^2$ and 500 mm$^2$, and
wherein the one or more holographic optical elements comprise one or more diffractive optical elements.

2. A lighting apparatus for a motor vehicle, comprising:
a light module, wherein the light module comprises:
a laser light source for generating laser light, wherein the laser light source comprises one or more laser diodes, and
an optical device on which the laser light is incident and which is configured such that the optical device generates a predefined symbol arrangement in an area surrounding the motor vehicle, wherein the optical apparatus comprises one or more holographic optical elements which are substantially non-absorbent to the laser light and which are configured to produce interference of the laser light by phase modulation thereof in order to generate the predefined symbol arrangement,
wherein the light module is configured such that the laser light of the laser light source is directed to the optical apparatus with interposition of one or more optical fibers.

3. The lighting apparatus according to claim 1, wherein
the laser light source is an RGB laser light source which comprises a number of red laser diodes, a number of green laser diodes and a number of blue laser diodes,
a first holographic optical structure on which the red laser light of the number of red laser diodes is incident is associated with the number of red laser diodes, a second holographic optical structure on which the green laser light of the number of green laser diodes is incident is associated with the number of green laser diodes, and a third holographic optical structure on which the blue laser light of the diodes is incident is associated with the number of blue laser diodes, the first, second and third holographic optical structures are constituent parts of the one or more holographic optical elements, and the light module is configured such that the red, green and blue laser light is superimposed after passing the first, second and third holographic optical structures and as a result the predefined symbol arrangement is generated in white light.

4. A lighting apparatus for a motor vehicle, comprising:

a light module, wherein the light module comprises:

a laser light source for generating laser light, wherein the laser light source comprises one or more laser diodes, and an optical device on which the laser light is incident and which is configured such that the optical device generates a predefined symbol arrangement in an area surrounding the motor vehicle, wherein the optical apparatus comprises one or more holographic optical elements which are substantially non-absorbent to the laser light and which are configured to produce interference of the laser light by phase modulation thereof in order to generate the predefined symbol arrangement, wherein the optical device comprises, in addition to the one or more holographic optical elements, one or more further optical elements which follow the one or more holographic optical elements in the beam path of the laser light.

5. The lighting apparatus according to claim 4, wherein the one or more further optical elements are lenses and/or mirrors.

6. The lighting apparatus according to claim 4, wherein the one or more further optical elements comprise:

a first mirror on which only a first laser light selected from the red, green and blue laser light is incident when the light module is switched on and which reflects the first laser light, a second mirror on which only the first laser light, which is reflected at the first mirror, and a second laser light selected from the red, green and blue laser light are incident when the light module is switched on, wherein the second laser light differs from the first laser light and wherein the second mirror reflects the second laser light and transmits the first laser light, and a third mirror on which only the first laser light, which is transmitted at the second mirror, the second laser light, which is reflected at the second mirror, and a third laser light selected from the red, green and blue laser light are incident when the light module is switched on, wherein the third laser light differs from the first and second laser light and wherein the third mirror reflects the third laser light and transmits the first and second laser light, wherein the first, second and third mirrors are arranged in relation to one another such that the laser light which is reflected at said mirrors is superimposed and as a result the symbol arrangement is generated in white light.

7. The lighting apparatus according to claim 1, further comprising:

an actuator system with which the light module is movable relative to a remainder of the lighting apparatus.

8. The lighting apparatus according to claim 7, further comprising:

a control device configured to receive sensor signals from a surrounding area sensor system of the motor vehicle and to control processes of switching on and switching off the light module depending on said sensor signals of the surrounding area sensor system.

9. The lighting apparatus according to claim 8, wherein the control device is further configured such that the light module is switched on when one or more objects at a minimum distance from the motor vehicle are detected by the surrounding area sensor system.

10. A motor vehicle comprising one or more lighting apparatuses according to claim 1.

* * * * *